April 16, 1957  J. H. BOEHM  2,789,197
ELECTRICAL SYSTEM AND LOAD LIMIT CONTROL MEANS THEREFOR
Filed May 25, 1953  2 Sheets-Sheet 1

INVENTOR.
John H. Boehm

April 16, 1957 J. H. BOEHM 2,789,197
ELECTRICAL SYSTEM AND LOAD LIMIT CONTROL MEANS THEREFOR
Filed May 25, 1953 2 Sheets-Sheet 2
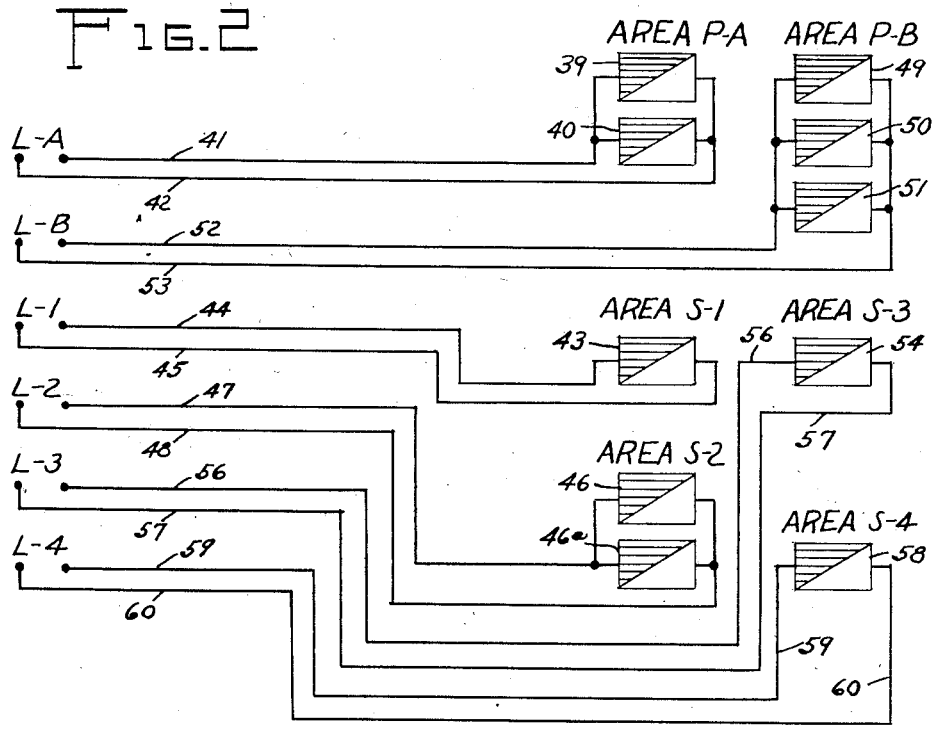
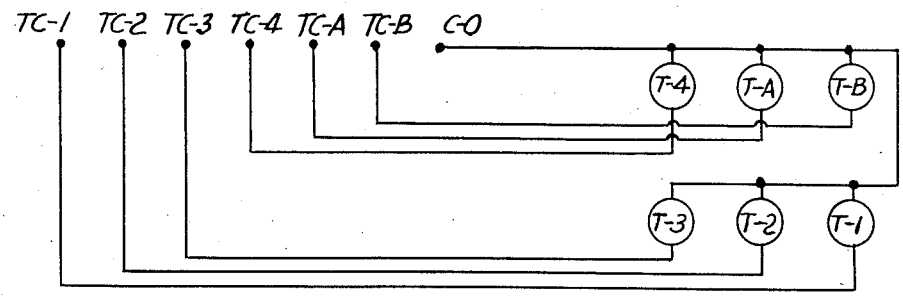
INVENTOR.
John H. Boehm
BY Robert Cobb
Attorneys

United States Patent Office 2,789,197
Patented Apr. 16, 1957

2,789,197

ELECTRICAL SYSTEM AND LOAD LIMIT CONTROL MEANS THEREFOR

John H. Boehm, Forest, Ohio, assignor to Heckler-Boehm, Inc., Forest, Ohio

Application May 25, 1953, Serial No. 357,283

10 Claims. (Cl. 219—20)

This invention relates to electrical systems and load limit control means for controlling electrical circuits in such a manner as to reduce the peak demand upon the facilities for supplying electrical energy below that which would normally be required to service the connected load.

The matter of control of peak demand upon facilities for supplying electrical energy, is one of considerable importance from the standpoint of efficient utilization of such facilities. The problem involves the fact that from the standpoint of satisfactory relations with customers using electrical power, the facilities for supplying electrical energy to such customers must be capable of satisfying at all times the peak demand load which may be placed upon such facilities, yet if such peak demand load is too high in relation to the total amount of electric current consumed, the margin of profit to the operators of the facilities will not be sufficient to justify the provision of facilities capable of satisfying such peak demand load.

The problem stems of course, from the fact that a large number of electrical devices which consume large amounts of electric power when in use, are not in use continuously but only intermittently or irregularly so that the total amount of current consumed thereby in any given period is quite small in relation to the peak demand load which the use of such devices places upon the power supply facilities.

From the standpoint of economical use of the power supply facilities, therefore, it is quite clear that the peak demand load must in some way be limited or controlled so that the total amount of electric power consumed or sold during a given period is profitable in relation to the cost of providing facilities capable of satisfying the peak demand load.

Load limit control means heretofore employed for the above purpose have availed of timing devices for completely disconnecting a part of the load for specified intervals, or have availed of load responsive control means for completely disconnecting a part of the load when a predetermined load has been attained. In the case of either type of prior used load limit control means, the current consuming devices connected to the part of the circuit which is disconnected are completely incapacitated in the period of disconnection of that part of the circuit.

The aforementioned prior types of load limit control means are not entirely satisfactory under any condition, but they are especially unsatisfactory for employment in conjunction with current consuming devices which, although only in operation intermittently, are relied upon for automatic operation of such devices, as for example in the case of home heating devices which, if completely incapacitated for certain periods, would cause uncomfortable and unhealthful variations in temperature.

In the matter of providing power facilities for the supplying of electrical energy for space heating with electric heaters of the resistance type, the problem of load limit control is twofold. There is first of all, a general over-all problem of controlling the peak demand load so that it is as low as possible in relation to the amount of current consumed.

The second phase of this problem involves the fact that employment of load limit control means of previous types in connection with home heating equipment, involving complete disconnection of a part of the load at certain times, would result in having no heat whatsoever applied to certain areas of the space to be heated during those intervals, and would result in uncomfortable and undesirable variations of temperatures.

One of the principal objects, therefore, of the present invention is to provide load limit control means capable of more satisfactory reduction of peak demand loads in relation to total power consumed with a smaller increase in power facilities relative to increase in the power consumed.

Another principal object of the invention is to provide load limit control means capable of effecting reduction of peak demand loads in relation to increased power consumed while continuously maintaining power supply available to the power consuming devices.

A further principal object of the invention is to provide load limit control means capable of reducing the demand load on power facilities supplying electrical power to connected circuits while at the same time rendering electrical power available to said circuits continuously.

A further principal object of the invention is to provide load limit control means capable of reducing the demand load on power facilities while rendering maximum power continuously available to a primary circuit, and while rendering power available continuously to an associated secondary circuit either at a maximum rate or a predetermined reduced rate.

A further principal object of the invention is to provide load limit control means capable of reducing peak demand load upon electrical power supply facilities while rendering maximum power continuously available to a primary circuit, and rendering power continuously available to an associated secondary circuit either at a maximum rate when power is not being consumed by the primary circuit, or at a reduced rate in the secondary circuit when power is being consumed by the primary circuit.

Still a further object of the present invention is to provide an electrical power system in which primary and secondary electrical circuits subject to different power requirements are associated together in such a manner that maximum power is continuously rendered available to the primary circuit, power is rendered available to the secondary circuit at the maximum rate when the power demands of the primary circuit have been satisfied and power is rendered available to the secondary circuit at a reduced rate when power is being consumed in the primary circuit at the maximum rate.

A further object of the invention is to provide an electrical system in which primary and secondary electrical circuits having respective primary and secondary power requirements are associated together in such a manner that the maximum power requirements of the primary circuit are always fully satisfied and the minimum power requirements of the secondary circuit are always fully satisfied and wherein the maximum power requirements of the secondary circuit are satisfied during periods in which there is reduced power demand on the primary circuit.

Another object of the invention is to provide an electrical system for controlling the supply of electrical current to a plurality of electrical space heaters wherein certain of said heaters located in an area of primary heat requirements are so associated with other of said heaters located in an area of secondary heat requirements as to render maximum power continuously available to the heaters in the primary heat requirement area for the satisfaction of the primary heat requirement in said area and to render power continuously available to the heaters in the secondary heat requirement area for the satisfaction of minimum heat requirement of the secondary area during periods of maximum heat requirement in the primary area and for the satisfaction of maximum heat requirements in the secondary area during periods of reduced heat requirement in the primary area.

In carrying my invention into practice I provide an electrical system including a primary circuit, a secondary circuit, a source of electrical power for said circuits, and automatic control means for said circuits operative to supply electrical power from said source to said primary circuit at a given rate whenever the latter circuit has a predetermined demand for current consumption, said control means being operative to supply current to said secondary circuit from said source of power at a reduced rate whenever the primary circuit has said predetermined demand for current consumption, said control means being operative to supply current from said source of power to said secondary circuit at an increased rate whenever said predetermined demand for current consumption on the primary circuit no longer exists.

In the embodiment of the invention herein disclosed, the control means include automatic switching instrumentalities normally operative to connect the secondary circuit to the source of power for supplying electrical energy to the secondary circuit at the maximum rate. Said control means further include devices operative to actuate the switch means responsive to the demand for current consumption in the primary circuit whereby to connect the primary circuit to the source of power for supplying electrical current to the primary circuit at the maximum rate and to simultaneously connect the secondary circuit to the source of power for supplying electrical energy to the secondary circuit at a reduced rate.

The embodiment of the invention herein disclosed comprises an electrical heating system employing a plurality of space heaters of the electrical resistance type, the heating units being disposed in a plurality of areas having different heating requirements, the heating units disposed in areas having primary heat requirements being connected to the primary circuit and the heating units being disposed in areas having secondary heating requirements being connected to the secondary circuit.

Other objects, advantages, and features of the invention will become apparent from the following detailed description taken in conjunction with the accompanying drawings in which:

Figure 1 is a schematic wiring diagram showing an electrical system embodying my invention, the shown arrangement comprising two primary circuits each having two associated secondary circuits, and showing the automatic switch means interconnecting the primary and secondary circuits, the automatic switch means in each of the secondary circuits, and the control instrumentalities for said switch means.

Figure 2 is a schematic wiring diagram of the portion of the electrical system including the heater units, showing the same disposed in respective primary and secondary areas to be heated thereby and showing the manner of their connection with the primary and secondary circuits of Figure 1.

Figure 3 is a schematic wiring diagram of the thermostats for controlling the operation of the heating units in the respective primary and secondary areas and showing the manner of the connection of the respective thermostats in the electrical system of Figure 1.

Figure 1:
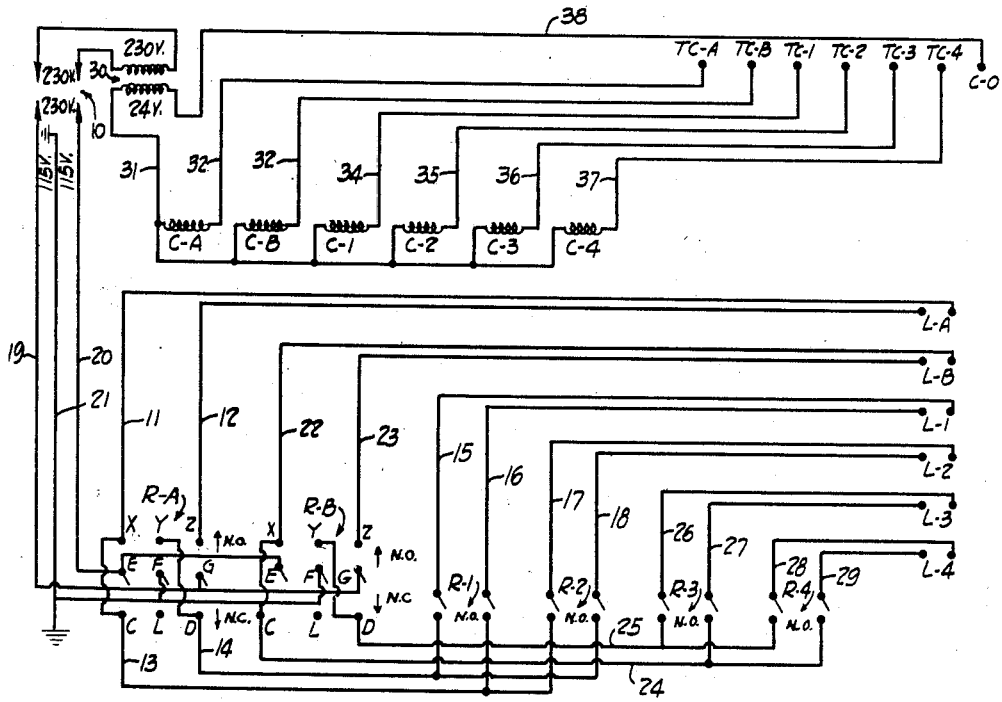

The various figures of the drawing, taken together, disclose an electrical system embodying the invention as applied to an exemplary home heating installation utilizing electrical heaters of the resistance type. In a typical five room house such as that illustrated by the floor plan of Figure 4, the utilization of resistance type space heaters would require a heating system of approximately eight to ten thousand watts and would, in the absence of suitable load limit control means, result in increasing the peak load demand upon the electrical supply facilities by that amount, thus nearly doubling the demand in relation to the requirements of the typical home for electricity for other normal uses without resulting in a sufficiently increased sale of electricity to justify the necessary increase in facilities for supplying such peak demand. By the employment of the electrical system of the invention however it has been found that the peak demand load can be greatly reduced without detrimentally affecting the efficiency of an electrical home heating system, whereby the number of kilowatt hours of electricity which can be sold per kilowatt of demand is greatly increased even as compared to the present normal load factor for other uses of electricity.

In the application of the invention to electrical home heating system, it is notable that the various rooms of a home have different heating requirements. For example, the kitchen, dining room, and living room areas being those most constantly used are the areas in which it is most desirable to maintain a fairly constant higher temperature than is required in reference to other rooms of the home such as bedrooms, bathrooms, and utility rooms, which are not so constantly used and which may be maintained at lower temperature or in which the need for higher temperature is not so constant.

For the purposes of the application of the invention herein disclosed, the rooms of the home may be designated as primary areas or secondary areas, depending upon the nature of their temperature requirements, the primary areas being those having first priority in demand for heat, and the secondary areas being those having secondary requirements in reference to demand for heat.

The present invention contemplates the provision of an electrical system comprising primary and secondary interrelated circuits designed to accommodate respective primary and secondary requirements for electrical power in such a way that these requirements are adequately met while effecting a substantial reduction in the peak demand load upon the electrical power supply facilities.

Referring to Figure 1, the electrical system there shown includes a source of electrical power designated by the numeral 10, which may as indicated comprise a source of 230-volt alternating current or direct current. This system further comprises a primary circuit comprising the wires 11 and 12 leading to contacts L–A, and two interrelated secondary circuits, one of these secondary circuits comprising wires 13 and 14 leading through relay R–1 to contacts L–1 through wires 15 and 16, and the other interrelated secondary circuits comprising the wires 17 and 18 leading to contacts L–2 and through relay R–2 to said wires 13 and 14. The interrelation of the primary and secondary circuits thus far described, is controlled by automatic switching means, comprising the relay generally designated R–A. Power is supplied to contacts E and G of relay R–A at the maximum rate of 230 volts through lines 19 and 20 leading to the source of power 10. Power is also supplied to contacts E and F of relay R–A at a reduced rate of 115 volts through lines 20 and 21.

The electrical system of Figure 1 includes a second primary circuit comprising wires 22 and 23 leading from contacts X and Z of relay R–B to contacts L–B and two secondary circuits interrelated with this primary circuit, the first of these latter secondary circuits comprising wires 24 and 25 leading through relay R–3 and wires 26 and 27 to contacts L–3, and the other interrelated secondary circuit comprising wires 28 and 29 leading to contacts L–4 and through relay R–4 to said wires 24 and 25. The primary circuit to contacts L–B and the interrelated secondary circuits to contact L–3 and to contact L–4 are controlled as to their interrelation by automatic switching means comprising the relay R–B, the maximum 230 volt power being supplied to contacts E and G of relay R–B, and the reduced rate (115 volt) power being supplied to contacts E and F of relay R-B in the same manner from lines 19, 20 and 20, 21 as described in reference to the supplying of power to the corresponding contacts of relay R–A.

In the electrical system of Figure 1, 24 volt current is supplied from the power source 10 to coil C–A of relay R–A, to coil C–B of relay R–B, to coil C–1 of relay R–1, to coil C–2 of relay R–2, to coil C–3 of relay R–3, and to coil C–4 of relay R–4.

Figure 4:
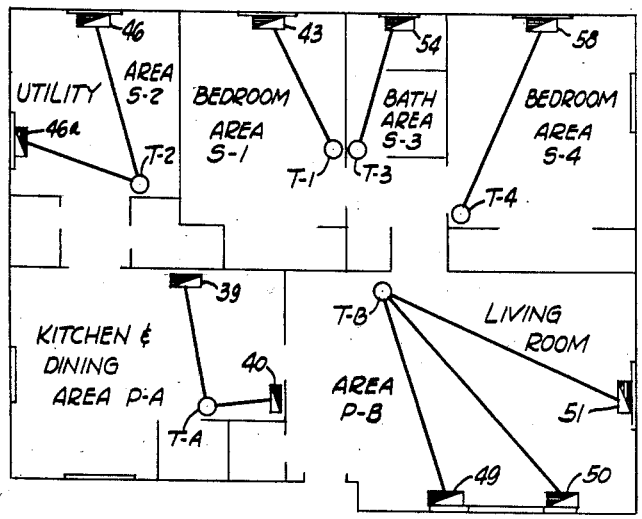
Figure 4 is a view comprising a floor plan of a house or the space to be heated, showing the division of the rooms into respective primary and secondary areas and showing the disposition and arrangement of the respective heating units and respective thermostats controlling the same, related to the electrical system disclosed in Figures 1, 2, 3.

In the electrical system disclosed, the circuit through each respective relay coil C–A, C–B, C–1, C–2, C–3 and C–4, is controlled by a respective thermostat, T–A, T–B, T–1, T–2, T–3, and T–4, see Figures 3 and 4. The circuit for relay coil C–A is from transformer 30 through wire 31, through coil C–A and wire 32 to thermostat contact TC–A. The circuits for relay coil C–B, C–1, C–2, C–3, and C–4, are respectively through wires, 33, 34, 35, 36 and 37 to corresponding thermostat contact TC–B, TC–1, TC–2, TC–3 and TC–4. The thermostat circuit is shown in Figure 3, and its manner of connection with the relay coil circuits of Figure 1 is indicated by corresponding designation of thermostat contacts TC–A, TC–B, TC–1, TC–2, TC–3 and TC–4; the contact C–0 indicated in both Figures 1 and 3 leads through the common return line 38 back to the transformer 30.

Referring now more particularly to Figures 2 and 4, the arrangement of electrical heating units of the resistance type in a typical home heating installation is indicated, and the manner of connection of said heater units with the primary and secondary circuits above described, is likewise indicated. Thus, the heater units 39 and 40 located in the primary area designated P–A and comprising the combination kitchen and dining room area, are connected through wires 41 and 42 through contacts L–A to the primary circuit connected with relay R–A. The heating unit 43 located in secondary area S–1 comprising one of the bedrooms, is connected through wires 44 and 45 through contacts L–1 to the secondary circuit connected to relay R–1. The heater units 46, 46a are connected through wires 47 and 48 and contacts L–2 to the secondary circuit connected to relay R–2.

As above mentioned, the secondary circuit connected to relay R–1 and the secondary circuit connected to relay R–2, are both interrelated with the primary circuit comprising wires 11 and 12 connected to relay R–A and the interrelation of these primary and secondary circuits is effected by operation of the automatic switching means comprising relay R–A. The primary area P–A is one having first priority with reference to satisfaction of its demand for heat, and the secondary areas S–1 and S–2 are areas of secondary importance in reference to the satisfaction of their demands for heat. By the manner of connection of the heating units in secondary areas S–1 and S–2 with the secondary circuits interrelated through relay R–A with the primary circuit comprising wires 11 and 12, and by connecting the heating unit in primary area P–A with said primary circuit, the heating units in primary area P–A are given first priority in reference to the supplying of current thereto at the maximum rate of 230 volts for the satisfaction of the demand for heat in said primary area P–A, and the heating units in secondary areas S–1 and S–2, are given second priority with reference to the supply of current thereto, at the maximum rate of 230 volts, so that the latter condition occurs only during the periods when the heating requirement of primary area P–A has been fully satisfied. Nevertheless, even when the primary circuit is being supplied with power at the maximum rate of 230 volts, power is at the same time made available to the secondary circuits at the reduced rate of 115 volts.

In a similar manner, the heating units 49, 50 and 51, located in primary area P–B comprising the living room, are connected by wires 52 and 53, to contacts L–B to the primary circuit comprising wires 23 and 22, leading to relay R–B. The heating units 54 located in secondary area S–3 comprising the bathroom, is connected by wires 56 and 57 through contacts L–3 to the secondary circuit comprising wires 26 and 27 leading to relay R–3. The heating unit 58 in secondary area S–4 is connected by wires 59 and 60 through contacts L–4 to the secondary circuit leading to relay R–4.

As above mentioned, the secondary circuits connected to relays R–3 and R–4 are interrelated with the primary circuit comprising wires 22 and 23 connected to relay R–B so that the latter primary circuit has first priority in reference to the supplying thereto of current at the maximum rate of 230 volts, and the interrelated secondary circuits have secondary preference with reference to the supplying of current thereto at said maximum rate, so that the satisfaction of heat requirements in primary area P–B are given first priority, and the satisfaction of heat requirements in the secondary areas S–3 and S–4 are rendered secondary to those of primary area P–B.

It will be understood of course that the heat requirements in each respective primary and secondary area, are controlled by the respective thermostats T–A, T–B, T–1, T–2, T–3 and T–4 for each area, the same being located in the respective areas as shown by Figure 4, so that current will be supplied to the respective heating units in the respective areas only when the temperature in any such area falls below that of the thermostat setting.

*Operation*

Now describing the operation of the electrical system herein disclosed, it is notable that the automatic switch means comprising the relay R–A in normally closed condition, provides connection between contacts E and C, between contacts F and L, and between contacts G and D. The normally closed position of the automatic switching means comprising the relay R–B is the same. The normally closed positions of the relays R–A and R–B are so indicated in Figure 1. In the normally closed position of relay R–A, it will be seen that relays R–1 and R–2 are connected through wire 13, contact C, and contact E to line 20, and through wire 14, contact D and contact G to line 19 so that relays R–1 and R–2 are supplied with current at 230 volts, the maximum rate. Similarly, in the normally closed position of relay R–B, relays R–3 and R–4 are connected through wires 24 and 25 and contacts C and D of relay R–B to the power lines 20 and 19 respectively so that relays R–3 and R–4 are also supplied with current at 230 volts, the maximum rate. As indicated in Figure 1, relays R–1, R–2, R–3 and R–4 are normally open.

Under the foregoing conditions, if any of the thermostats T–1, T–2, T–3, or T–4 demands heat in the respective secondary areas S–1, S–2, S–3 or S–4 the respective relay R–1, R–2, R–3 or R–4, is caused to close for supplying of current to the heating unit in the respective secondary area at 230 volts, the maximum rate.

It will be understood of course that whenever one of the thermostats in one of the respective secondary areas demands heat, the circuit to the respective coil C–1, C–2, C–3 or C–4 is closed which in turn effects closing of the respective relay R–1, R–2, R–3, or R–4; otherwise these relays are normally open as indicated in Figure 1.

Now if the thermostat in primary area P–A demands heat, the circuit through coil C–A is closed and the switch of relay R–A is moved so as to disconnect contacts E, F and G from contacts C, L and D and cause contact E to be connected with contact X, contact F to be connected with contact Y, and contact G to be connected with contact Z. In this condition, the primary circuit comprising the wires 11 and 12 is connected to lines 20 and 19 so that the heating units in primary area P-A are supplied with current at 230 volts, the maximum rate. In this condition of relay R-A, electrical current is supplied to relays R-1 and R-2 at the reduced rate of 115 volts with wire 13 connected to line 20 through contact C, jumper wire 65 to contact X, and contact E, and wire 14 being connected through contact D, jumper wire 66, contact Y and contact F to line 21. Under this condition, any demand for heat in secondary areas S-1 or S-2 results in current being supplied to the heating units in those areas at the reduced rate of 115 volts. This condition obtains as long as the thermostat in primary area P-A demands heat. Whenever the thermostat in primary area P-A ceases to demand heat, the circuit to coil C-A is broken and relay R-A is thereby automatically restored to its normally closed condition in which electric current is supplied to relays R-1 and R-2 at 230 volts, the maximum rate.

The operation of relay R-B is identical with that above described in reference to relay R-A so that whenever the thermostat in primary area P-B demands heat, current is supplied to the primary circuit including wires 22 and 23 and the heaters in primary area P-B connected therewith at the maximum rate of 230 volts, current at the same time being supplied to relays R-3 and R-4 for providing the secondary circuits associated therewith with current at the reduced rate of 115 volts, the secondary circuits controlled by the relays R-3 and R-4 being supplied with current at the maximum rate of 230 volts whenever the thermostat in primary area P-B does not demand heat.

Thus, the primary heat requirements of the primary areas are capable of being satisfied at all times to the extent of the capacity of the maximum available power supply, and at the same time the requirements for heat in the secondary areas are capable of being at least partially satisfied at all times to the extent of the capacity of the maximum rate of power supplied during those periods in which the heat requirements in the primary area have been satisfied, and to the extent of the capacity of the reduced rate of power supply during those periods in which the primary requirements for heat in the primary area are being satisfied.

In the use of previously known types of load limit control means in conjunction with electrical heating equipment, where a portion of the load is completely disconnected, it has been found that temperature drops of up to 20 degrees may be experienced in those areas which have had the load entirely disconnected, in limiting the overall demand load. On the other hand, by the use of the electrical system herein disclosed, it has been found possible to reduce the peak demand load created by the heating system to approximately 50 percent of the rated capacity of the heating system with a resulting temperature drop of only two to four degrees in the secondary areas during those periods when they are being supplied with electrical power at the reduced rate of approximately 50 percent of the maximum rate.

In further explanation of how these results are achieved, let us assume that each of the heating units of the resistance type, is rated at 1000 watt capacity consumption at 230 volts. When such a heating unit is operated at the rated voltage, 1000 watts of electricity is consumed with a production of 3413 B. t. u. of heat for each hour that the unit is in operation. If the voltage applied to this unit is reduced by 50 percent, it will consume only 250 watts and will produce approximately 850 B. t. u. of heat per hour while it is operated at this voltage. Thus, while the peak demand load is reduced by 50 percent, the current consumption is reduced to 25 percent and the B. t. u. production is reduced to 25 percent with a reduction of surface temperature of the heating element of only 50 percent or from approximately 250 degrees F., to about 125 degrees F.

The explanation of the reduction in current consumption is found in the application of Ohm's law from which is derived the formula $I=E/R$ wherein I represents the current in amperes, E the voltage, and R the resistance in ohms, and from the formula for determining watts in which $W=E\times I$ where W represents watts, E voltage, and I current in amperes. Now it follows that with a heating unit of 1000 watts and voltage of 230 volts, a current of 4.348 amperes is required (watts divided by volts, equals current by applying the watt formula). In this case, since from Ohm's law $R=E/I$, the resistance of the unit may be obtained by dividing 230 (volts) by 4.348 (amperes) which gives a resistance of 52.9 ohms for the unit. Now if the voltage is reduced by one-half, the watts consumed will be reduced to one-fourth. This follows from the fact that the resistance of 52.9 ohms is not variable, and the voltage after having been reduced by 50 percent, is 115 volts from which it is seen that the current is 2.17 amperes (from the formula $$I=R=\frac{115}{52.9})$$

Going back to the watt formula $(W=E\times I=115\times 2.17)$, it is found that the watts consumed will be approximately 250 watts or approximately one-fourth the current normally consumed when the unit is supplied at 230 volts. This result is effected by the reduction of 50 percent in the voltage, as compared with the 1000 watts consumption when the maximum rate of 230 volts was applied.

As above mentioned, the reduction in current consumption to one-fourth results in a B. t. u. production of one-fourth of the rated capacity, but with a reduction of surface temperature of the heating element of only about 50 percent from 250° F. to 125° F.

From the foregoing, it will be understood that by the use of the electrical system of the invention, the peak demand load for electrical power created by the heating system may be reduced by approximately 50 percent without materially reducing the efficiency of the heating system, due to the fact that power is always supplied to the secondary circuit at a minimum reduced rate so that large temperature drops do not occur in the secondary areas and their temperature requirements are made up at the maximum rate of power supply during periods when the heat requirements of the secondary areas have been satisfied.

I claim:

1. An electrical heating system of the class described, comprising, in combination, a plurality of electrical heating units, one disposed in an area having primary heating requirements and another of said heating units being disposed in an area having secondary heating requirements, a primary circuit for the heating unit in the primary area, a secondary circuit for the heating unit in the secondary area, a source of electrical power for said circuits, and control means for said circuits and comprising automatic switching means including instrumentalities responsive to demand for heat in said primary area and operative to actuate said switching means to connect the primary circuit to the source of power for supplying electrical energy to the heating unit in the primary area at a given rate whenever there is demand for heat in said primary area, instrumentalities operative to connect the secondary circuit to the source of power for supplying electrical energy to the heating unit in the secondary area at a reduced rate whenever said demand for heat in the primary area exists, and means operative to actuate said switching means for connecting the secondary circuit to the source of power for supplying electrical energy to the heating unit in the secondary area at an increased rate whenever said demand for heat in the primary area does not exist.

2. Load limit control means of the class described, comprising, in combination, means for connecting a portion of a given electrical load to a source of electrical power for supplying electrical energy to said portion of the load at a given rate when that portion has demand for current consumption, means for connecting another portion of said load to the source of power for supplying electrical energy to said other portion of said load at a reduced rate whenever the first portion of the load has said demand for current consumption, and means for connecting said other portion of said load to said source of power for supplying electrical energy to said other portion of said load at an increased rate whenever said demand for current consumption on the first portion of said load does not exist.

3. An electrical system of the class described, comprising, in combination, a primary circuit, a secondary circuit, a source of power for said circuits, and control means for said circuits comprising automatic switching means including instrumentalities responsive to demand for current in said primary circuit and operative to actuate said switching means to connect said primary circuit to the source of power for supplying electrical energy to the primary circuit at a given rate whenever there is demand for current consumption in said primary circuit, instrumentalities for connecting the secondary circuit to the source of power for supplying electrical energy to the secondary circuit at a reduced rate whenever the primary circuit has said demand for current consumption, and instrumentalities operative to actuate said switching means for connecting said secondary circuit to said source of power for supplying electrical energy to said secondary circuit at an increased rate whenever the demand for current consumption in said primary circuit does not exist.

4. An electrical system of the class described, comprising, in combination, a primary circuit, a secondary circuit, a source of power for said circuits, and control means for said circuits comprising automatic switching means including instrumentalities responsive to demand for current in said primary circuit and operative to actuate said switching means to connect said primary circuit to the source of power for supplying electrical energy to the primary circuit at a given rate whenever the primary circuit has demand for electrical current consumption, said instrumentalities including an electrical current responsive actuating device, a temperature responsive actuating device for controlling operation of said current responsive device, instrumentalities for connecting said secondary circuit to said source of power for supplying electrical energy to said secondary circuit at a reduced rate whenever the primary circuit has said demand for current consumption, and instrumentalities operative to actuate said switching means for connecting the secondary circuit to the source of power for supplying electrical energy to the secondary circuit at an increased rate whenever the demand for current in said primary circuit does not exist.

5. An electrical heating system of the class described, comprising, in combination, a plurality of electrical heating units, one disposed in an area having primary heating requirements, another of said heating units being disposed in an area having secondary heating requirements, a primary circuit for the heating unit in the primary area, a secondary circuit for the heating unit in the secondary area, a source of electrical power for said circuits, and control means for said circuits comprising automatic switching means including instrumentalities operative to connect the primary circuit to the source of power for supplying electrical energy at a given rate to the heating unit in the primary area whenever a predetermined demand for heat exists in said area, said instrumentalities including current responsive means for actuating said switching means and temperature responsive means in said primary area for controlling operation of said current responsive means, instrumentalities operative to connect the secondary circuit to the source of power for supplying electrical energy to the heating unit of said secondary area at a reduced rate whenever said predetermined demand for heat exists in said primary area, and instrumentalities operative to connect the secondary circuit to the source of power for supplying electrical energy to the heating unit in the secondary area at an increased rate whenever said predetermined demand for heat in the primary area does not exist, the instrumentalities for connecting the secondary circuit to the source of power including current responsive means in said secondary circuit, and temperature responsive means in said secondary area for controlling operation of said latter current responsive means.

6. An electrical system of the class described, comprising, in combination, a plurality of associated electrical circuits, a source of electrical power for said circuits, and control means for said circuits comprising instrumentalites operative to supply power from said source to one of said circuits at a given rate whenever a given demand for power consumption exists in said circuit, instrumentalities operative to supply power from said source to another of said circuits at a lesser rate while the first circuit is being supplied at said given rate, and instrumentalities operative to supply power from said source to said another circuit at an increased rate whenever the demand for power consumption by the first circuit does not exist.

7. An electrical system of the class described, in combination, a primary circuit, a secondary circuit, a source of electrical power for said circuits, and control means for said circuits including automatic switching means normally operative to supply electrical power at a given rate from said source to said secondary circuit whenever there is no demand for current consumption in the primary circuit, said switching means being operative to supply electrical power to said primary circuit from said source of power at said given rate whenever the primary circuit has demand for current consumption, and said switching means being operative to supply electrical power from said source of power to said secondary circuit at a reduced rate whenever there is demand for current consumption on the primary circuit.

8. In an electrical system of the class described, in combination, a primary circuit, a secondary circuit, a source of electrical power for said circuits, and control means for said circuits comprising automatic switching instrumentalities normally operative to connect the secondary circuit to the source of power for supplying power to the secondary circuit at a given rate whenever there is no demand for current consumption in the primary circuit, said switching instrumentalities including means automatically operative to connect the primary circuit to said source of power for supplying electrical power to said primary circuit at said given rate whenever the primary circuit has demand for current consumption, and said switching instrumentalities including means to connect the secondary circuit to the source of power for supplying electrical energy to the secondary circuit at a reduced rate whenever said demand for current consumption on the primary circuit exists.

9. An electrical system of the class described, comprising, in combination, a primary circuit, a secondary circuit, a source of electrical power for said circuits, and control means for said circuits comprising automatic switching means including instrumentalities normally operative to connect the secondary circuit to the source of power for supplying electrical energy to the secondary circuit at a given rate whenever there is no demand for current consumption on the primary circuit, instrumentalities responsive to demand for current consumption in the primary circuit, operative to connect the primary circuit to said source of power for supplying electrical energy to said primary circuit at said given rate whenever there is demand for current consumption in the primary circuit, and instrumentalities operative to connect the secondary circuit to the source of power for supplying electrical energy to the secondary circuit at a reduced rate whenever said demand for current consumption on the primary circuit exists, and means in said secondary circuit operative in response to demand for current consumption to connect said secondary circuit to a current consuming device.

10. An electrical heating system of the class described, comprising, in combination, a plurality of heating units, one disposed in an area having primary heating requirements, another of said units disposed in a secondary area having secondary heating requirements, a primary circuit, a secondary circuit, a source of electrical power for said circuits, and control means for said circuits comprising automatic switching means including instrumentalities normally operative to connect the secondary circuit to the source of power for supplying electrical energy at a given rate to the heating unit in the secondary area whenever there is no demand for heat in the primary area, instrumentalities operative to connect the primary circuit to the source of power for supplying electrical energy to the heating unit in the primary area at said given rate whenever demand for heat in the primary area exists, and instrumentalities operative to connect the secondary circuit to the source of power for supplying electrical energy to the heating unit in the secondary area at a reduced rate whenever there is demand for current consumption by the heating unit in the primary area.

References Cited in the file of this patent
UNITED STATES PATENTS

| | | |
|---|---|---|
| 1,511,050 | Collins et al. | Oct. 7, 1924 |
| 1,743,115 | Clark | Jan. 14, 1930 |
| 2,055,246 | Bradbury | Sept. 22, 1936 |
| 2,110,727 | Heinisch et al. | Mar. 8, 1938 |
| 2,199,639 | Lee et al. | May 7, 1940 |
| 2,521,171 | Kercher | Sept. 5, 1950 |
| 2,573,846 | Kercher | Nov. 6, 1951 |
| 2,627,013 | McCabe | Jan. 27, 1953 |